US00RE34510E

United States Patent [19]

Shoji et al.

[11] E Patent Number: Re. 34,510

[45] Reissued Date of Patent: Jan. 18, 1994

[54] PRESSURE SENSOR

[75] Inventors: Rihito Shoji, Yawata; Hiroyuki Hase, Katano; Masayuki Wakamiya, Suita, all of Japan

[73] Assignee: Matsushita Electric Industrial Co., Ltd., Osaka, Japan

[21] Appl. No.: 908,169

[22] Filed: Jul. 2, 1992

Related U.S. Patent Documents

Reissue of:

[64] Patent No.: 4,938,069
Issued: Jul. 3, 1990
Appl. No.: 421,154
Filed: Oct. 13, 1989

[30] Foreign Application Priority Data

| | | | |
|---|---|---|---|
| Oct. 26, 1988 | [JP] | Japan | 63-269900 |
| Mar. 23, 1989 | [JP] | Japan | 1-070835 |
| May 2, 1989 | [JP] | Japan | 1-113395 |

[51] Int. Cl.[5] ..... G01L 9/10
[52] U.S. Cl. ..... 73/728; 336/30
[58] Field of Search ..... 73/728, 722, 756; 336/30

[56] References Cited

U.S. PATENT DOCUMENTS

| | | | |
|---|---|---|---|
| 3,197,722 | 6/1961 | Chass | 336/30 |
| 4,696,192 | 9/1987 | Yamashita et al. | 73/728 |
| 5,165,284 | 11/1992 | Shoji et al. | 73/728 |

FOREIGN PATENT DOCUMENTS

| | | |
|---|---|---|
| 3604088 | 8/1987 | Fed. Rep. of Germany . |
| 59-111033 | 6/1984 | Japan . |
| 62-228927 | 10/1987 | Japan . |
| 963965 | 7/1964 | United Kingdom . |

*Primary Examiner*—Donald O. Woodiel
*Attorney, Agent, or Firm*—Stevens, Davis, Miller & Mosher

[57] ABSTRACT

A pressure sensor having the structure wherein an amorphous magnetic alloy member or members are secured to both of a deforming part which is distorted by a pressure and a non-deforming part which is not distorted by a pressure and elements for detecting the change of a permeability of the amorphous magnetic alloy are respectively disposed at each of the amorphous magnetic alloy members, can measure the magnitude of an applied pressure with high accuracy while suppressing a drift of the output accompanied with the change of a temperature.

7 Claims, 11 Drawing Sheets

PRESSURE SENSOR

Matter enclosed in heavy brackets [ ] appears in the original patent but forms no part of this reissue specification; matter printed in italics indicates the additions made by reissue.

BACKGROUND OF THE INVENTION

The present invention relates to a pressure sensor utilizing a magnetostriction effect of an amorphous magnetic alloy.

Recently, a pressure sensor utilizing a magnetostriction effect of an amorphous magnetic alloy has been proposed, as disclosed in Japanese Patent Unexamined Publication No. 59-111033 (A) for instance.

FIG. 12 is a schematic sectional view of an example of such a conventional pressure sensor.

With reference to FIG. 12, reference numeral 71 denotes a columnar body made of a soft magnetic material, in which an annular groove 71a is formed. On the columnar body 71 there are disposed an amorphous magnetic alloy disc 72 capable of exhibiting magnetostriction and a non-magnetic amorphous alloy spacer 73. A cover 74 equipped with an O-ring 75, in which through-holes 76 are formed, has a hollow portion acting as a pressure introducing opening 74a. A coil 78 is located in the annular groove 71a. All of these members are received in a receptacle 77. Reference numeral 79 denotes a detector unit.

A pressure applied through the pressure introducing opening 74a transmits to the through-hole 76 and push down the amorphous magnetic alloy disc 72, so that a stress is applied onto the amorphous magnetic alloy disc 72. The stress changes a permeability of the amorphous magnetic alloy because of magnetostriction. The change of the permeability is detected as the change in an inductance of the coil 78, to measure the magnitude of the applied pressure by the detection circuit 79.

The amorphous magnetic alloy used in the pressure sensor as afore-mentioned was uneven in thickness and inferior in flatness. Consequently, in the conventional pressure sensor using a thin strip of an amorphous magnetic alloy, the deformation of the thin strip at the time of applying a pressure is suppressed by friction between the thin strip and the spacer. Thereby, the conventional pressure sensor produces such an output characteristics as shown in FIG. 13. With reference to FIG. 13, there is noticed a hysteresis, i.e. a characteristic curve in case of applying a pressure and a characteristic curve in case of reducing an applied pressure from a pressed state are different from each other. Besides, the output voltage characteristics is inferior in linearly, too.

FIG. 14 shows the influence of a temperature on the output voltage of the conventional pressure sensor held under a constant pressure condition. In FIG. 14, it should be noted that the output voltage of the pressure sensor is changed in response to the rising of the temperature.

As afore-mentioned, the conventional pressure sensor was disadvantageous disadvantage because of the change in the output depending on the temperature, and the presence of hysteresis caused by the uneven thickness of the amorphous magnetic alloy, and because its output was inferior in linearity.

SUMMARY OF THE INVENTION

An object of the present invention is to provide a pressure sensor which shows an output characteristics excellent in linearity and free from a hysteresis as well as temperature-dependence.

According to the present invention, the object can be attained by a pressure sensor comprising a pressure introducing opening, a deforming part to be distorted by a pressure applied through the pressure introducing opening, a non-deforming part not to be distorted by the application of the pressure, an amorphous magnetic alloy member or members having a magnetostriction effect and secured to both of the deforming and non-deforming parts, permeability detector elements each disposed respectively at the deforming part and the non-deforming part in such a manner as to constitute a magnetic circuit in combination with the (corresponding) amorphous magnetic alloy member, and an electric means for detecting the changes of permeabilities in said two elements accompanied with the application of the pressure and a difference therebetween.

BRIEF DESCRIPTION OF THE DRAWINGS

FIG. 1a shows the section of the pressure sensor taken along the line [B—B] *1b—1b* in FIG. 1b, while FIG. 1bshows the section of the pressure sensor taken along the line [A—A] *1a—1a* in FIG. 1a;

DETAILED DESCRIPTION OF THE PREFERRED EMBODIMENTS

Hereinafter, embodiments of the present invention will be explained with reference to the drawings.

EXAMPLE 1

Figure 1A:
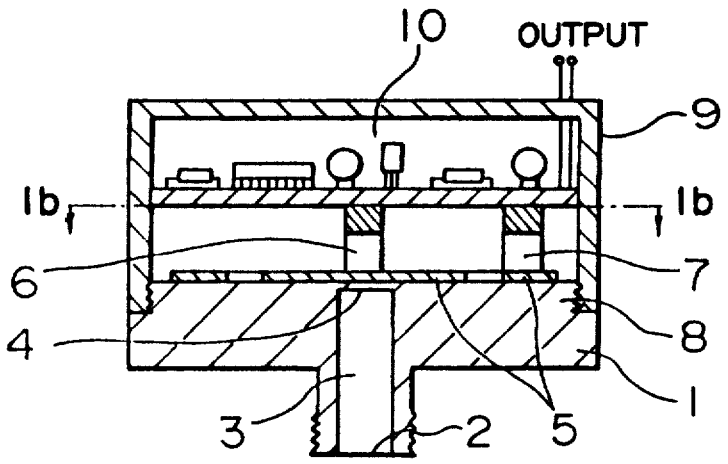
FIGS. 1a and 1b are respectively vertical and horizontal sectional views of a pressure sensor in an embodiment of the present invention. where
Figure 1B:
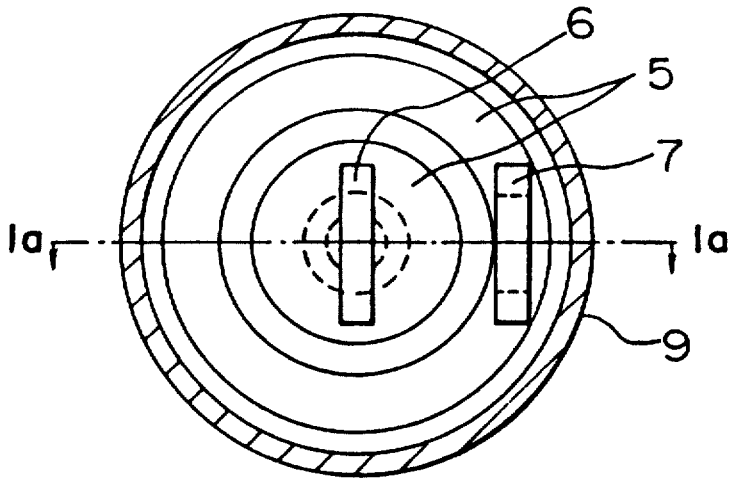

FIGS. 1a and 1b show an outline of a pressure sensor in an embodiment of the present invention. FIG. 1a is a vertical sectional view of the pressure sensor, while FIG. 1b is a horizontal sectional view of the pressure sensor.

With reference to FIGS. 1a and 1b, a cylindrical columnar body 1 made of stainless steel SUS 304 has a diameter of 5 cm and a height of 1 cm. A pressure introducing opening 2 of 1 cm in diameter and 1 cm in height is formed at one end of the columnar body 1, to provide a hole 3 for transmitting a pressure. A part 4 of the columnar body 1 is worked to thickness of 0.1 cm to form a deforming part which is to be distorted by a pressure, while the other part of the columnar body 1 is made thick to act as a non-deforming part 8 not to be distorted by the pressure.

An amorphous Fe-Si-B alloy member 5 is secured onto both of the deforming or deformable part 4 and the non-deforming part 8 at the upper surface of the columnar body 1. A pressure detector head 6, prepared by winding coils onto a U-shaped ferrite core 40 turns, is located on the amorphous alloy member 5 secured onto the surface of the deforming part 4. A dummy head 7 having the same structure as that of the pressure detector head 6 and adapted to be operated differentially therewith is located on the amorphous alloy member 5 secured onto the surface of the non-deforming part 8. Herein, the dummy head means a head which is insensitive to a pressure for eliminating a drift of the output of the pressure sensor 6 in response to the change of an environmental temperature thereof. In this meaning, such head is referred to as a "dummy head" in the following description.

A magnetic field for measurement by the pressure detector head 6 and the dummy head 7 is of about 10 Oe. A detector unit or detection circuit 10 is attached to a cover 9 which is fixed to the columnar body 1 with screws.

The pressure detector head 6 and the dummy head 7 are fixed to the lower surface of a circuit board for the detector unit 10 by silicone rubber. The pressure detector head 6 is positioned in such a manner that its both ends are not located above the deforming part 4.

Now, operation of the pressure sensor afore-mentioned is explained.

A pressure applied through the pressure introducing opening 2 transmits along the hole 3 to the deforming part 4 and pushes the deforming part 4. Consequently, the amorphous magnetic alloy member 5 secured onto the surface of the deforming part 4 is deformed. This deformation changes the permeability of the amorphous magnetic alloy member 5 because of a magnetostriction effect. The change of the permeability is detected as the change in an inductance by the pressure detector unit 6.

On the other hand, an output of the dummy head 7 opposed to the non-deforming part 5 in the vicinity of the deforming part 4 is obtained. By deriving a difference between the outputs of the heads 6 and 7, the change of the pressure is detected.

Figure 2:
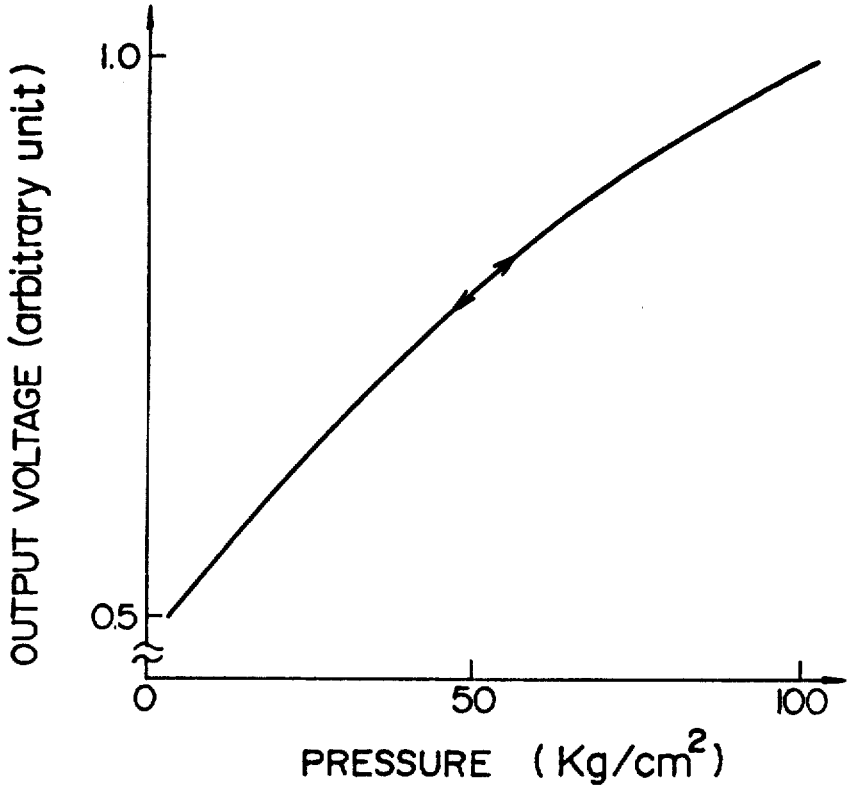
FIG. 2 is a graph of an output characteristics of the pressure sensor of FIGS. 1a and 1b.

An output characteristics of the pressure sensor thus constructed is shown as an example in FIG. 2. It can be seen from FIG. 2 that an output voltage increases in generally proportional relationship with the increase of an applied pressure, and that the output characteristics is improved without hysteresis. For comparison, an error of about 10% in the output of a conventional pressure sensor was unavoidable due to the hysteresis shown in FIG. 13. The error have been be reduced to about 1% by the structure of FIGS. 1a and 1b.

Figure 3:
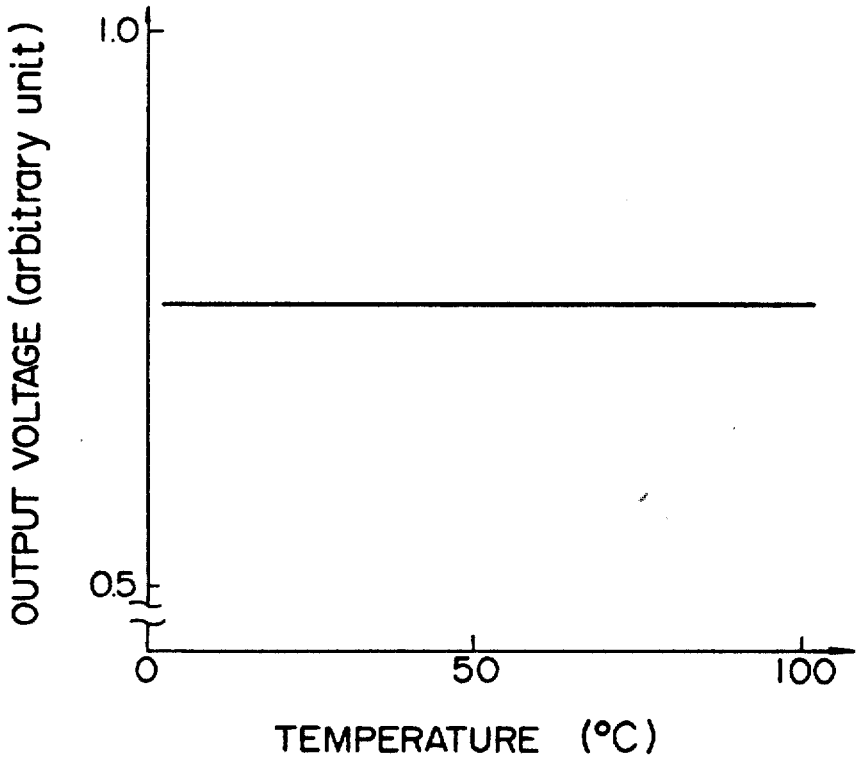
FIG. 3 is a graph of a temperature characteristics of the pressure sensor of FIGS. 1a and 1b.

A temperature characteristic of the pressure sensor having the above-mentioned structure under a constant pressure condition is shown in FIG. 3. It can be seen from FIG. 3 that an output voltage of the pressure sensor scarcely changes regardless of the change of a temperature.

Accordingly, there is provided a pressure sensor which can produce stable output regardless of the change of a temperature and without an error caused by the hysteresis.

EXAMPLE 2

Figure 4A:
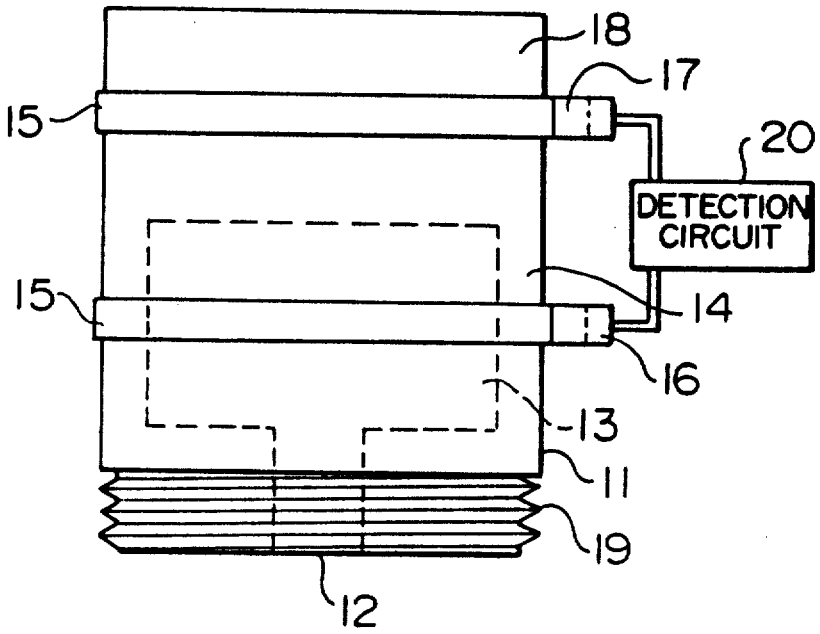
FIGS. 4a and 4b are respectively front and sectional views of a pressure sensor in the second embodiment of the present invention.
Figure 4B:
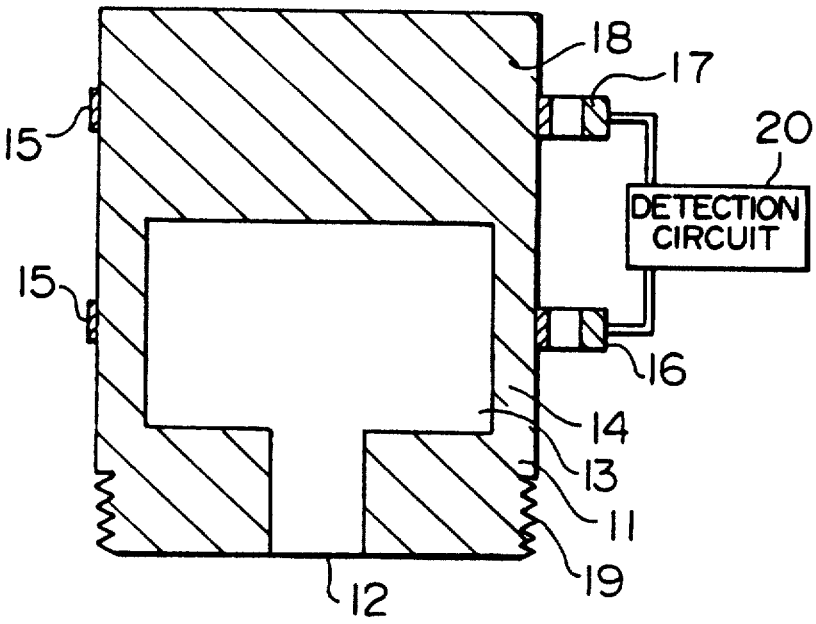

FIGS. 4a and 4b show a pressure sensor in the second embodiment of the present invention. FIG. 4a is a front view of the pressure sensor, while FIG. 4b is a sectional view of the pressure sensor.

With reference to FIGS. 4a and 4b, a cylindrical columnar body 11 made of titanium has a diameter of 2 cm and a height of 3 cm. A pressure introducing opening 12 formed at one end of the columnar body 11 is communicated with a pressure chamber 13 formed in the columnar body 11. A part 14 of the columnar body 11 is worked to thickness of 0.3 cm to provide a deforming part for transmission of a pressure, while the other part of the columnar body 11 is made thick to provide a non-deforming part 18 not to be distorted by application of a pressure.

Amorphous magnetic alloy members 15, made of a Fe-Si-B-Cr alloy exhibiting a positive magnetostriction, are adhered respectively onto the deforming part 14 and the non-deforming part 18 at the outer periphery of the columnar body 11 by adhering treatment using epoxy resin at 250° C. for 2 hrs. These amorphous magnetic alloy members 15 have a thermal expansion coefficient of about $7.8\times10^{-6}$ which is smaller than the expansion coefficient ($9\times10^{-6}$) of the columnar body 11 made of titanium. Due to the difference in the thermal expansion coefficient, a compressive stress is exerted on the amorphous magnetic alloy members 15, when the pressure sensor is cooled from the adhering temperature of 250° C. Consequently, the spontaneous magnetization can be aligned or oriented in the thickness direction of the amorphous magnetic alloy members 15.

A pressure detector head 16, prepared by winding coils onto a U-shaped ferrite core 40 turns, is located along an outer periphery of the amorphous magnetic alloy member 15 adhered to the outer periphery of the deforming part 14. A dummy head 17, having the same structure as that of the pressure detector head 16, is located along an outer periphery of the amorphous magnetic alloy member 15 adhered to the outer periphery of the non-deforming part 18. Reference numeral 19 denotes a screw thread for fixing the columnar body 11, and reference numeral 20 denotes detector unit or detection circuit.

Operation of the pressure sensor according to the second embodiment will now be explained.

A pressure applied through the pressure introducing opening 12 transmits to the pressure chamber 13 and acts as a stress to expand the pressure chamber 13. Consequently, the deforming part 14 is distorted, so that the permeability of the amorphous magnetic alloy member 15 adhered to the surface of the deforming part 14 is changed. This change in the permeability is detected by the pressure detector head 16, and the magnitude of the applied pressure is measured from a differential output between the outputs from the pressure detector head 16 and the dummy head 17.

The pressure sensor thus constructed has an output characteristics and a temperature characteristics similar to those shown in FIG. 2 and FIG. 3, respectively. In addition, because of the alignment the spontaneous magnetization, the same property as that in Example 1 was obtained with a measuring magnetic field of about 1 Oe. Accordingly, an electric power to be consumed by the detector unit 20 was reduced to 1/10 compared with that by the conventional one.

EXAMPLE 3

Figure 5:
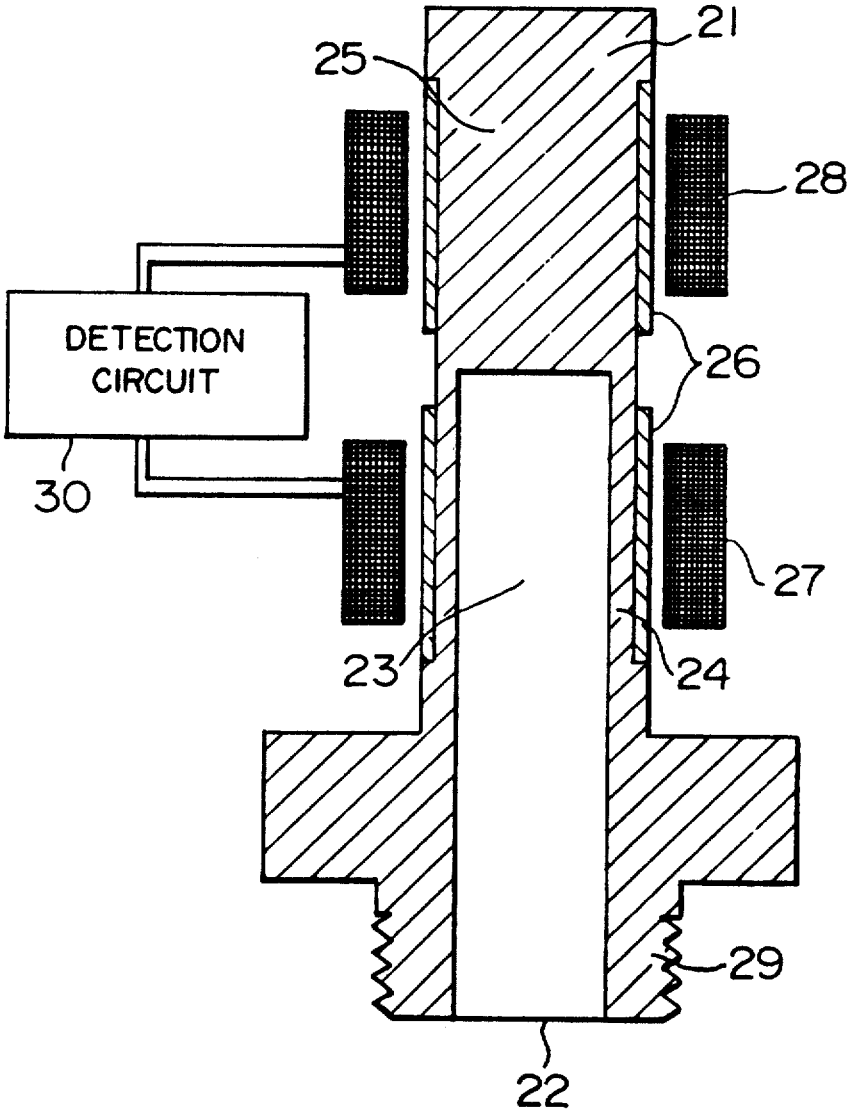
FIG. 5 is a sectional view of a pressure sensor in the third embodiment of the present invention.

FIG. 5 is a sectional view of a pressure sensor in the third embodiment of the present invention.

With reference to FIG. 5 a cylindrical columnar body 21 made of carbon steel S45C has a diameter of 1 cm and a height of 7 cm. A pressure introducing opening 22 of 0.7 cm in diameter is formed at one end of the columnar body 21. The pressure introducing opening 22 is communicated with a pressure chamber 23 formed in the columnar body 21. A part of the columnar body 21 is worked to thickness of 0.15 cm to provide a deforming part 24, while the other part of the columnar body 21 is made thick to provide a non-deforming part 25 not to be distorted by application of a pressure.

Amorphous magnetic alloy members 26, made of a Fe-Si-B-Cr alloy exhibiting positive magnetostriction, are respectively adhered to the deforming part 24 and the non-deforming part 25 at the outside of the columnar body 21 by adhering treatment using epoxy resin at 250° C. for 2 hrs. These amorphous magnetic alloy members 26, having a composition different from that of the amorphous magnetic alloy members 15 in Example 2, has a thermal expansion coefficient of about $9.9\times10^{-6}$. On the other hand, thermal expansion coefficient of the carbon steel is $11.2\times10^{-6}$. Therefore, the spontaneous magnetization can be aligned or oriented in the thickness direction of the amorphous magnetic alloy members 26 in the same way as that in Example 2.

A pressure detector coil 27, prepared by winding coils 63 turns, is located at the outside of the amorphous magnetic alloy member 26 adhered to the outer periphery of the deforming part 24. A dummy coil 28, having the same structure as that of the pressure detector coil 27, is located at the outside of the amorphous magnetic alloy member 26 adhered to the outer periphery of the non-deforming part 25. Herein, the dummy coil is also referred to as a coil, which is insensitive to a pressure, for eliminating a drift of output in response to the change of an environmental temperature of the pressure sensor. In this meaning, such a coil is referred to as "a dummy coil" in the following description. A screw thread 29 for fixing the columnar body 21 is formed with a pitch of PF $\frac{3}{8}$. Reference numeral 30 is a detector unit.

Operation of the pressure sensor aforementioned will now be explained below.

A pressure applied through the pressure introducing opening 22 transmits to the pressure chamber 23 and acts as a stress to expand the pressure chamber 23. As a result, the deforming part 24 is deformed, so that the amorphous magnetic alloy member 26 adhered to the outer surface of the deforming part 24 is deformed. This deformation changes the permeability of the amorphous magnetic alloy member 26 because of an inverse magnetostriction effect. The change of the permeability is detected as the change of an inductance by the pressure detector coil 27, and a differential between the outputs from the pressure detector coil 27 and the dummy coil 28 is derived by the detector unit 30. Thus, the change of an applied pressure is detected.

Figure 6:
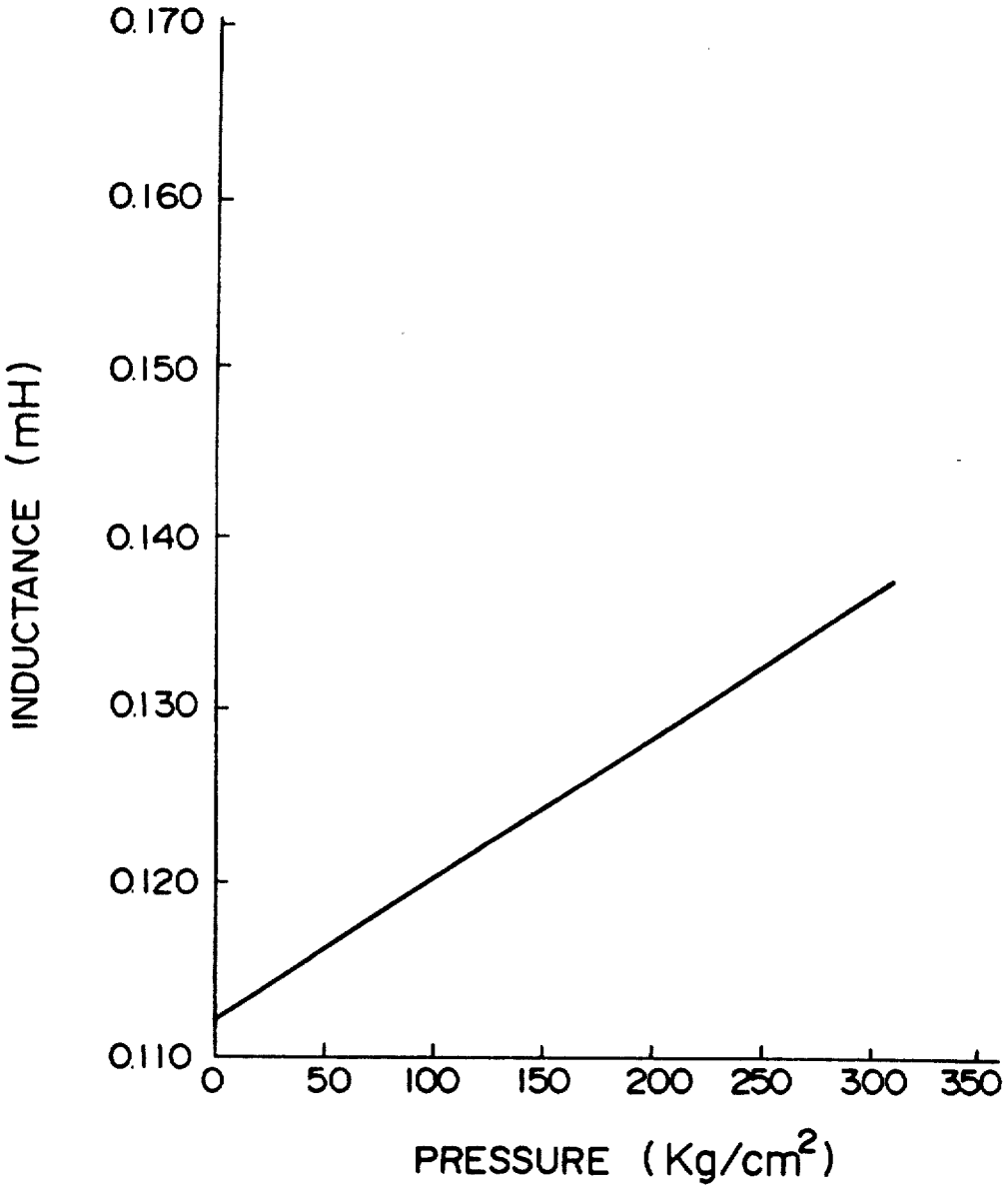
FIG. 6 is a graph of an output characteristics of the pressure sensor of FIG. 5.
Figure 13:
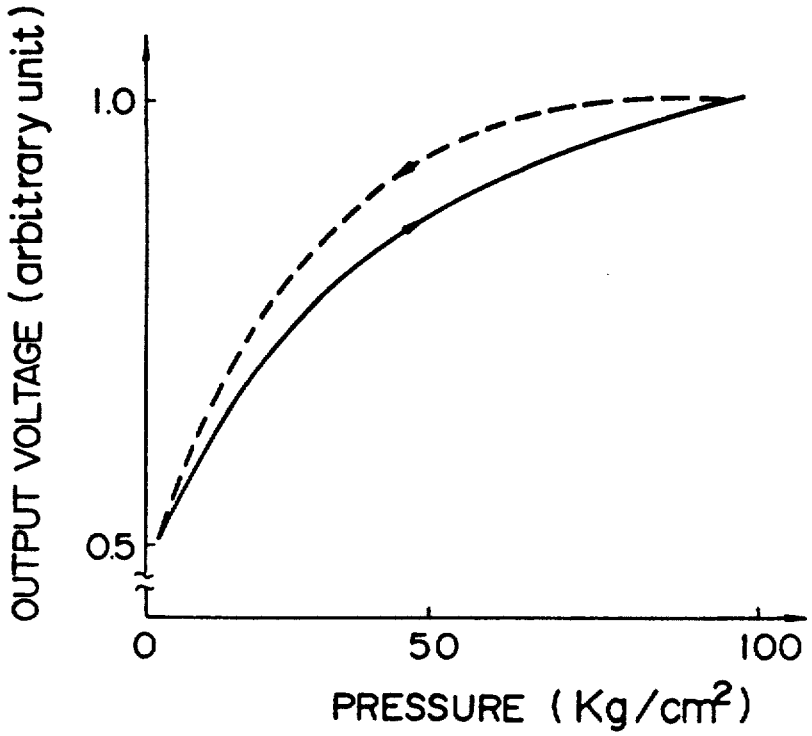
FIG. 13 is a graph of an output characteristics of the conventional pressure sensor of FIG. 12.
Figure 14:
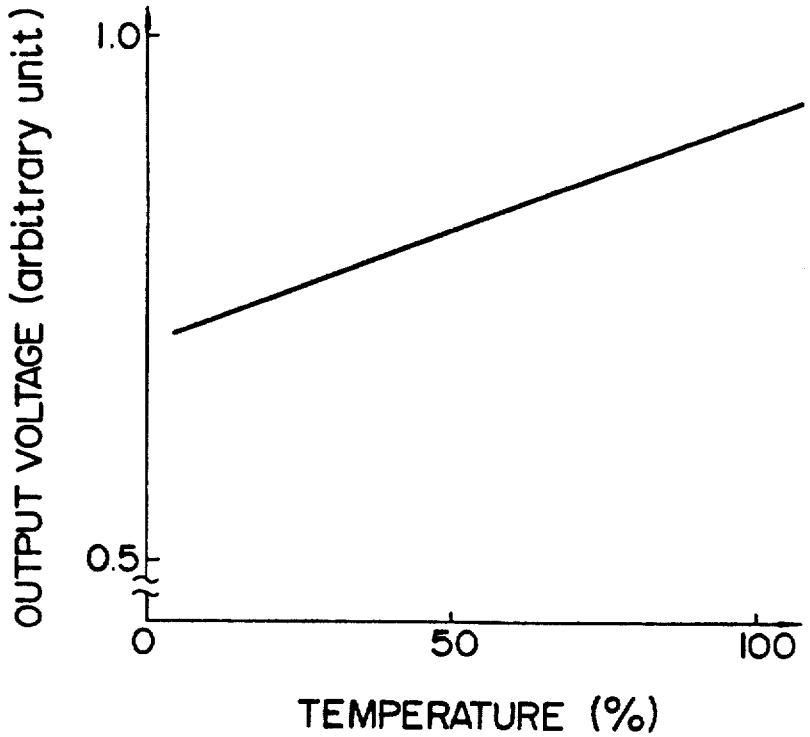
FIG. 14 is a graph of a temperature characteristic of the conventional pressure sensor of FIG. 12.

The pressure sensor having the above-mentioned structure has an output characteristics shown in FIG. 6. It should be noted from FIG. 6 that the inductance linearly increases in accordance with the increase of the applied pressure. A hysteresis was substantially eliminated, as compared with a conventional pressure sensor where a hysteresis of about 10% remains as shown in FIG. 13. The output characteristics was also improved in linearity. In addition, a temperature characteristic of the pressure sensor was the same as that of the pressure sensor in Example 2 shown in FIG. 3.

In this example, coils were used as elements for detecting a permeability. In this case, a magnetic filed for measuring was of about 1 Oe, and the saving of an electric power consumption was accomplished in the same way as that in Example 2. Moreover, the structure of the pressure sensor was simplified by using coils, so that manufacturing cost was reduced.

Accordingly, there is provided a pressure sensor which shows an excellent temperature characteristic and linearity with little hysteresis, in a case using coils as detector means.

EXAMPLE 4

Figure 7:
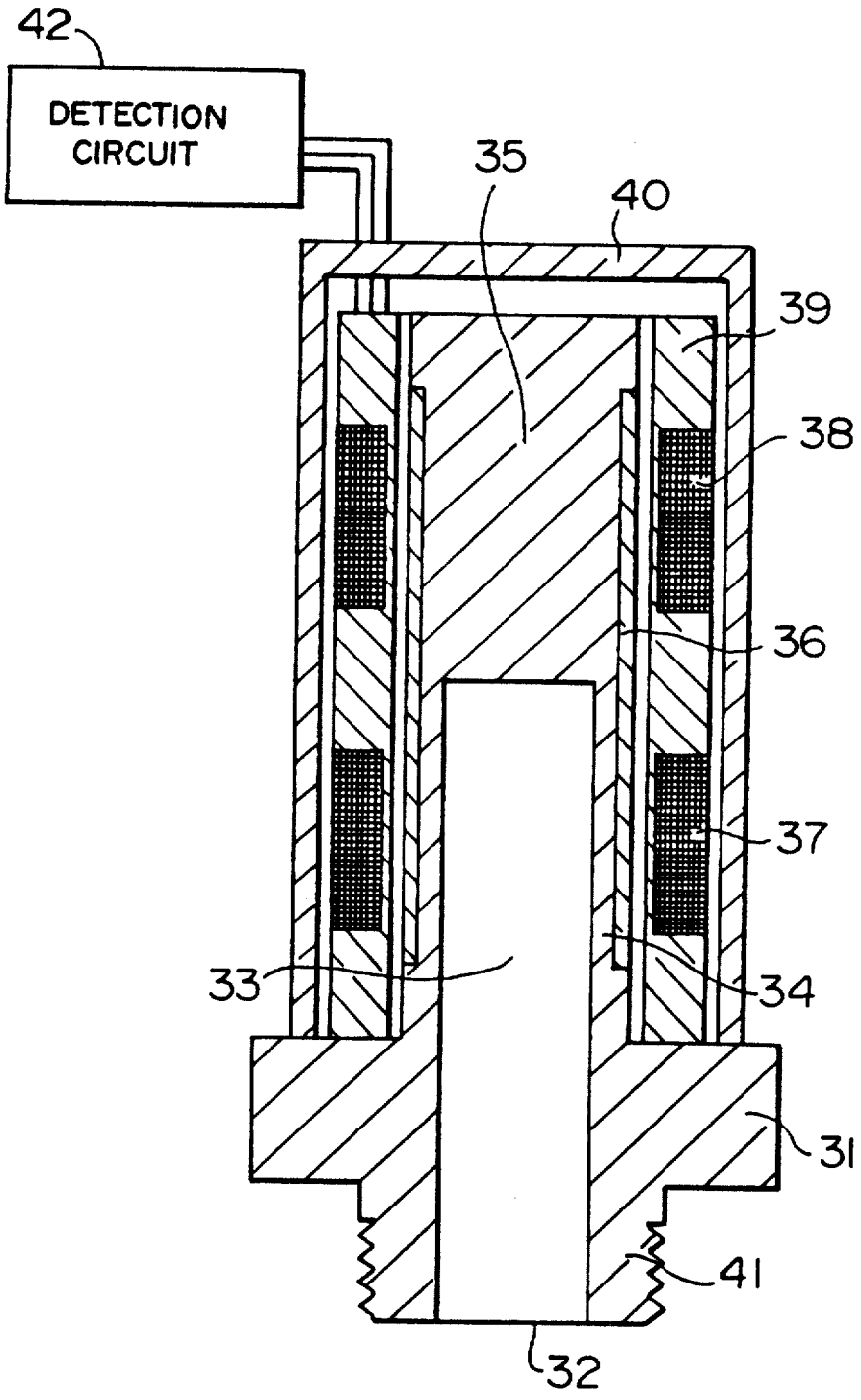
FIG. 7 is a sectional view of a pressure sensor in the fourth embodiment of the present invention.

FIG. 7 is a schematic sectional view of a pressure sensor in the fourth embodiment of the present invention.

With reference to FIG. 7, a cylindrical columnar body 31 made of titanium has a diameter of 1 cm and a height of 7 cm. A pressure introducing opening 32 of 0.6 cm in diameter is formed at one end of the columnar body 31. The pressure introducing opening 32 is communicated with a pressure chamber 33 for transmission of a pressure. A part of the columnar body 31 is worked to thickness of 0.2 cm to provide a deforming part 34, while the other part of the columnar body 31 is made thick to provide a non-deforming part 35 not to be distorted by the pressure.

An amorphous magnetic alloy member 36, made of a Fe-Si-B-Cr alloy exhibiting positive magnetostriction, is adhered to the columnar body 31 by adhering treatment using epoxy resin at 250° C. for 2 hrs., in such a manner that the deforming part 34 and the non-deforming part 35 are covered with the amorphous magnetic alloy member 36. In this case, the conditions for the adhering as well as the thermal expansion coefficients of the columnar body 31 and the amorphous magnetic alloy member 36 are the same as those in Example 2, so that the spontaneous magnetization of the amorphous magnetic alloy member 36 can be aligned or oriented in the thickness direction of the amorphous magnetic alloy member 36 in the same way as that in Example 2.

A bobbin 39 made of "teflon" (trademark of polytetrafluoroethylene), equipped with a pressure detector coil 37 prepared by winding coils of 63 turns therearound and a differential coil 38 having the same structure as that of the pressure detector coil 37, is mounted around the outer periphery of the amorphous magnetic alloy member 36. A yoke 40 made of a 45% Ni-Fe alloy is mounted around the outer periphery of the bobbin 39. A screw thread 41 for fixing the columnar body 31 is formed with a pitch of PF $\frac{3}{8}$ at the lower end of the outer periphery of the columnar body 31. The numeral 42 is a detector unit.

Operation of the pressure sensor afore-mentioned will now be explained below.

A pressure applied through the pressure introducing opening 32 transmits to the pressure chamber 33 and acts as a stress to expand the pressure chamber 33. As a result, the deforming part 34 is deformed, so that a part of the amorphous magnetic part alloy member 36 adhered to the outer surface of the deforming part 34 is deformed. This deformation changes the permeability of the amorphous magnetic alloy member 36 because of an inverse magnetostriction effect. The change of the permeability is detected as the change of an inductance by the pressure detector coil 37, and the difference between outputs of the pressure detector coil 37 and the dummy coil 38 is derived by the detector unit 42 to measure the magnitude of the applied pressured.

Figure 8:
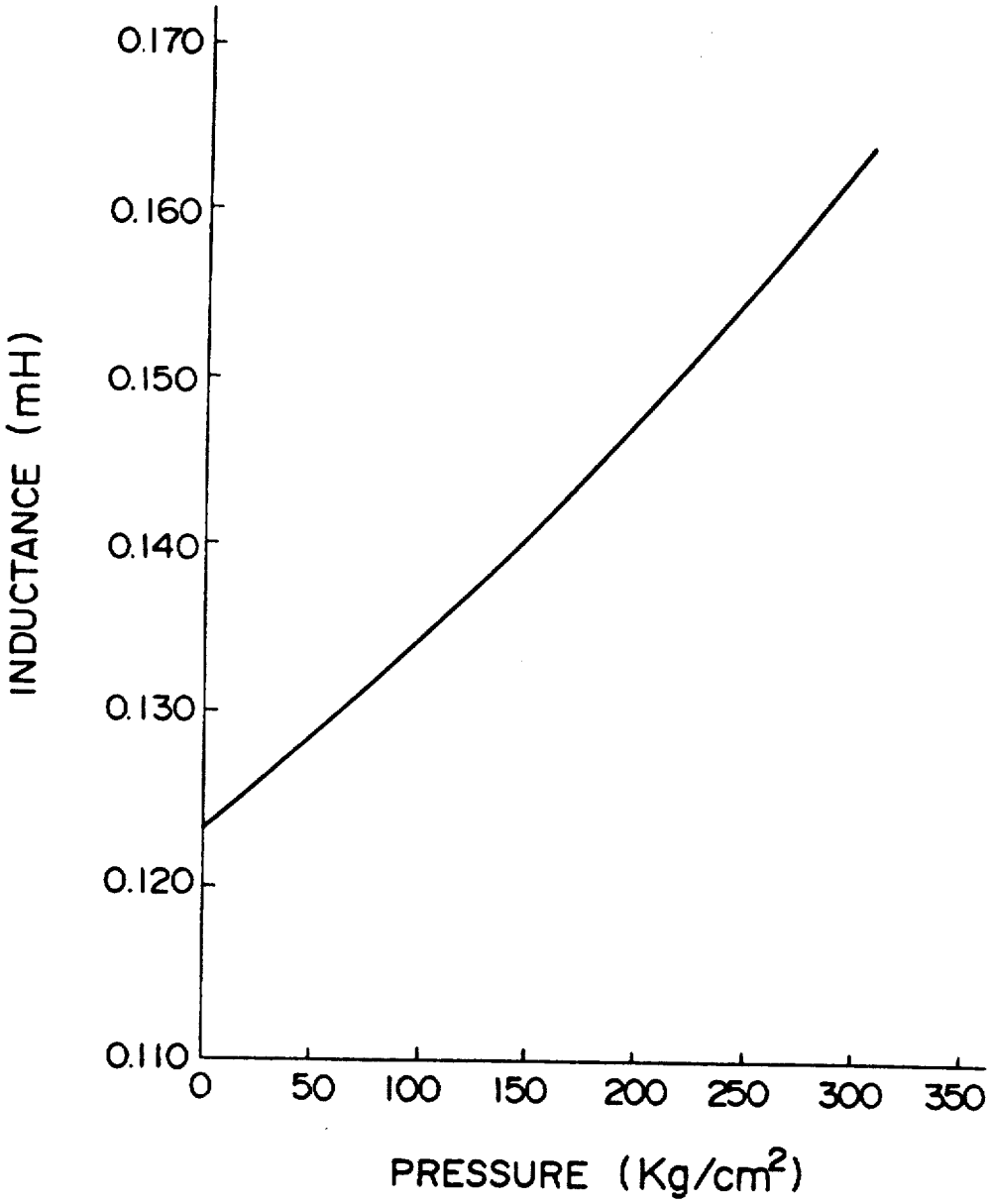
FIG. 8 is a graph of an output characteristics of the pressure sensor of FIG. 7.

The pressure sensor having the afore-mentioned structure has an output characteristics shown in FIG. 8. It should be noted from FIG. 8 that the inductance linearly increases in response to the increase of the applied pressure. A hysteresis is substantially eliminated as compared with the output characteristics of the conventional pressure sensor shown in FIG. 13, and the improvement in linearity is recognized.

An inductance change in this case was greater by about 40% than that in Example 3 shown in FIG. 6. This increased change of the inductance means that the pressure sensor in this example has improved sensitivity. This improvement is attained by the reason (a) that a pressure and position for adhering the amorphous magnetic alloy member 36 are held under the same conditions to avoid unevenness in adhering because of the use of a single the amorphous magnetic alloy member 36, and the reason (b) that the yoke of high permeability is disposed at the outside of the coils to eliminate the influence of environmental magnetic field such as terrestrial magnetism.

In the structure of this example, three conditions are simultaneously satisfied, i.e. the spontaneous magnetization is aligned or oriented in the thickness direction of the amorphous magnetic alloy member, the amorphous magnetic alloy member is constituted by a single integral member, and the yoke is disposed around the coils. However, this structure does not limit the present invention. One or two of the three conditions may be adopted independently. For instance, a pressure sensor wherein a single amorphous magnetic alloy member is used without aligning the spontaneous magnetization and without disposing a yoke; a pressure sensor wherein a single amorphous magnetic alloy member is used while aligning the spontaneous magnetization without disposing a yoke; a pressure sensor wherein a yoke is disposed around the coils, while using two separate amorphous magnetic alloy members without aligning the spontaneous magnetization; a pressure sensor wherein a yoke is disposed around the coils while aligning the spontaneous magnetization while using two separate amorphous magnetic alloy members; and a pressure sensor wherein a single amorphous magnetic alloy member is used while disposing a yoke around the coils without aligning the spontaneous magnetization are also within the scope of the present invention. All of these pressure sensors had improved sensitivities.

As for a temperature characteristic, the pressure sensor having any of the structures afore-mentioned has the same characteristic as that shown in FIG. 3.

Owing to the structure and the operation afore-mentioned, the pressure sensor improved in a temperature characteristic and linearity of the output with little hysteresis, as compared with a conventional pressure sensor, was obtained. In addition, the obtained pressure sensor showed higher sensitivity, as compared with the pressure sensor in Example 3.

In the structure afore-mentioned, the coils were used as a permeability detector element. A magnetic head may be used instead of the coils, to obtain the same improved sensitivity.

In the structure afore-mentioned, there was used an amorphous magnetic alloy member exhibiting positive magnetostriction and having smaller thermal expansion coefficient than that of the columnar body. However, an amorphous magnetic alloy exhibiting negative magnetostriction and having larger thermal expansion coefficient than that of the columnar body may be used instead, to obtain the same properties.

EXAMPLE 5

Figure 9:
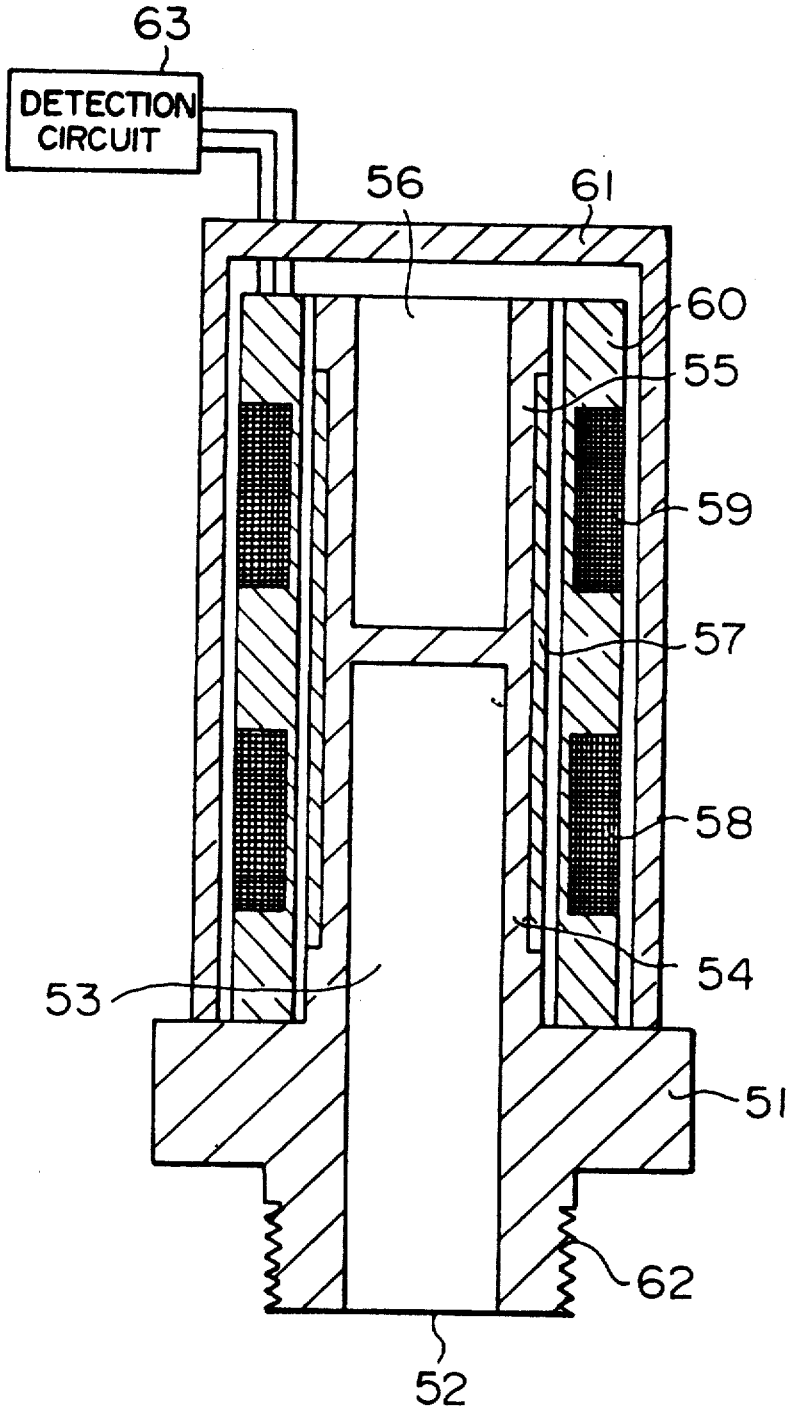
FIG. 9 is a sectional view of a pressure sensor in the fifth embodiment of the present invention.

FIG. 9 is a schematic sectional view of a pressure sensor in the fifth embodiment of the present invention.

With reference to FIG. 9, a cylindrical columnar body 51 made of titanium has a diameter of 10 mm and a hight of 70 mm. A pressure introducing opening 52 of 6 mm in diameter is formed at one end of the columnar body 51. The pressure introducing opening 52 is communicated with a pressure chamber 53 formed in the columnar body 5. A part of the columnar body 51 is worked to thickness of 2 mm to provide a deforming part 54. Inside a non-deforming part 55 which is not distorted by application of a pressure, there is formed a hollow portion 56 having the same size as that of the pressure chamber 53.

An amorphous magnetic Fe-Si-B-Cr alloy member 57 is secured to the columnar body 51 by adhering treatment using epoxy resin at 250° C. for 2 hrs., in such a manner that the deforming part 54 and the non-deforming part 55 are covered with the amorphous magnetic alloy member 57.

A bobbin 60 made of "teflon", equipped with a pressure detector coil 58 prepared by winding coils 100 turns around the bobbin 60 and a dummy coil 59 having the same structure as that of the pressure detector coil 58, is mounted around an outer periphery of the amorphous magnetic alloy member 57. A yoke 61 made of a 45% Ni-Fe alloy is mounted around the outer periphery of the bobbin 60. A screw thread 62 for fixing the columnar body 51 is formed with a pitch of PF $\frac{3}{8}$ at the lower end of the outer periphery of the columnar body 51. The numeral 63 is a detector unit.

Operation of the pressure sensor afore-mentioned will now be explained below.

A pressure applied through the pressure introducing opening 52 transmits to the pressure chamber 53 and acts as a stress to expand the pressure chamber 52. As a result, the deforming part 54 is deformed so that the amorphous magnetic alloy member 57 secured onto the surface of the deforming part 54 is deformed. This deformation changes a the permeability of the amorphous magnetic alloy member 57 because of an inverse magnetostriction effect. The change of the permeability is detected as the change of an inductance by the pressure detector coil 58, and the differential between outputs from the pressure detector coil 58 and the dummy coil 59 is derived by the detector unit 63 to measure the magnitude of the applied pressure.

Table 1 shows the ratios of zero-point drifts to sensitivities of the pressure sensor in this example and a conventional pressure sensor at a room temperature. It can be seen from Table 1 that the zero-point drift was suppressed to be about ½ to ¼, and that the temperature characteristic of the pressure sensor was improved.

TABLE 1

ZERO-POINT DRIFT PROPERTY IN RESPONSE TO TEMPERATURE

| temp. (°C.) | prior art (%) | example 5 (%) |
|---|---|---|
| −30 | 4.8 | 1.3 |
| 80 | 9.5 | 4.1 |

Owing to the structure and the operation afore-mentioned, a pressure sensor having good temperature characteristic as compared with a conventional pressure sensor could be obtained.

EXAMPLE 6

The pressure sensor of this example had the same structure as that shown in FIG. 9, except that an amorphous magnetic alloy member 57 was secured to the columnar body 51 by adhering treatment using thermosetting epoxy resin at 250° C. for 2 hrs. under the condition to satisfy the relationships defined below:

$$\epsilon_p = \frac{(2-\nu)r_i^2 P_i}{E(r_o^2 - r_i^2)} \quad (3)$$

where $r_i$: inner radius of the cylindrical columnar body $r_o$: outer radius of the columnar body $\alpha_a$: thermal expansion coefficient of the amorphous magnetic alloy $\alpha_t$: thermal expansion coefficient of the material of the columnar body $T_g$: adhering temperature $T_m$: operating temperature $\nu$: Poisson's ratio of the material of the columnar body E: Young's modulus of the material of the columnar body $P_i$: Maximum applied pressure The operation of the pressure sensor in this example is also the same in general as that of the pressure sensor in Example 5 shown in FIG. 9, and detailed explanation for these structures and operation is omitted.

In the pressure sensor having the structure aforementioned, a thermal strain $\epsilon_t$ produced in the amorphous magnetic alloy is $352\times10^{-6}$ from the equation (2) for an operating temperature $T_m=30°$ C. and $\alpha_t-\alpha_a=1.6\times10^{-6}$. On the other hand, when the maximum pressure ($P_i=202$ kg/cm$^2$) is applied to the columnar body, a strain $\epsilon_P$ produced in the columnar body is $163\times10^{-6}$ from the equation (3). Therefore, the pressure sensor having the above-mentioned structure satisfies the inequality relationship (1).

Figure 10:
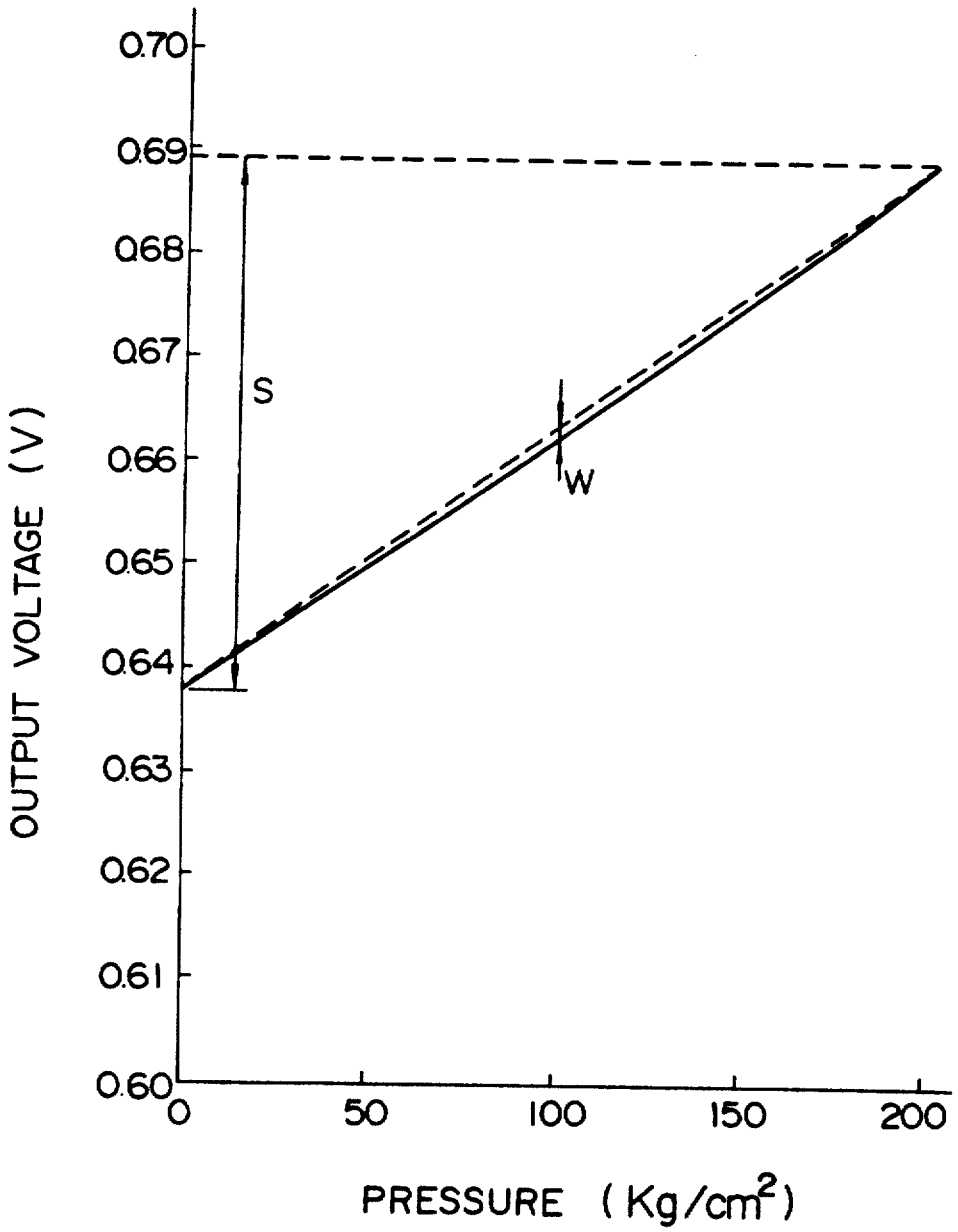
FIG. 10 is a graph of an output characteristics of the pressure sensor in the sixth embodiment of the present invention.

An example of the output characteristics of the pressure sensor is shown in FIG. 10. It can be seen from FIG. 10 that when a thermal strain due to the difference in thermal expansion coefficients between the material of the cylindrical columnar body and the amorphous magnetic alloy is larger than a strain caused by a pressure, the pressure sensor has such improved output characteristics with little hysteresis, high accuracy, and high linearity where a deviation from a straight line with respect to the width of sensitivity W/S in FIG. 10, is 3% only.

Figure 11:
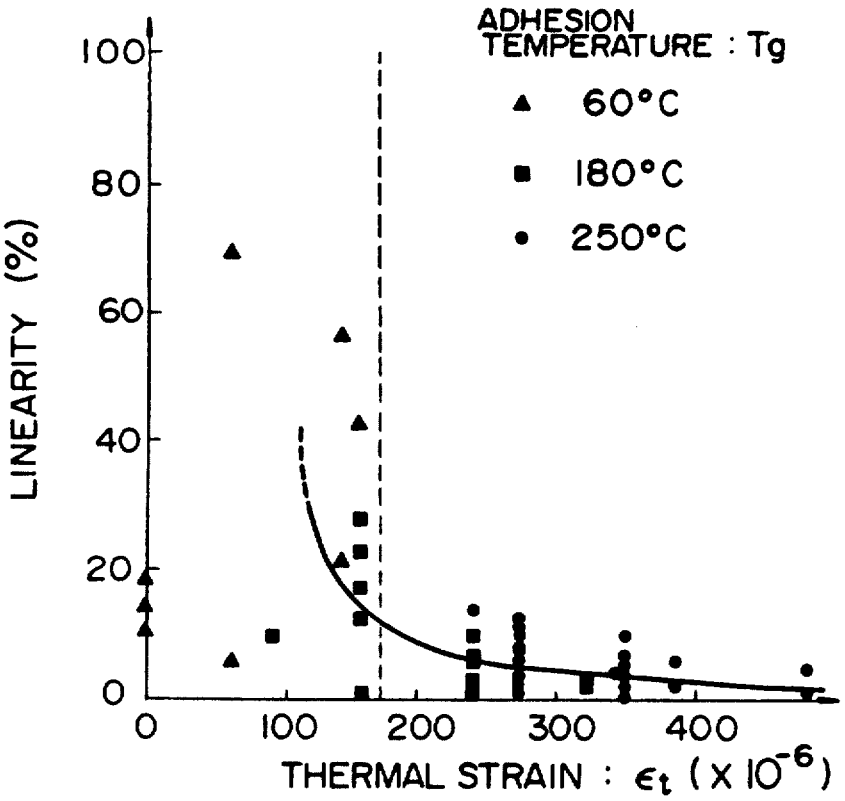
FIG. 11 is a graph showing a relationship between a thermal strain applied to the pressure sensor and a resulting linearity.
Figure 12:
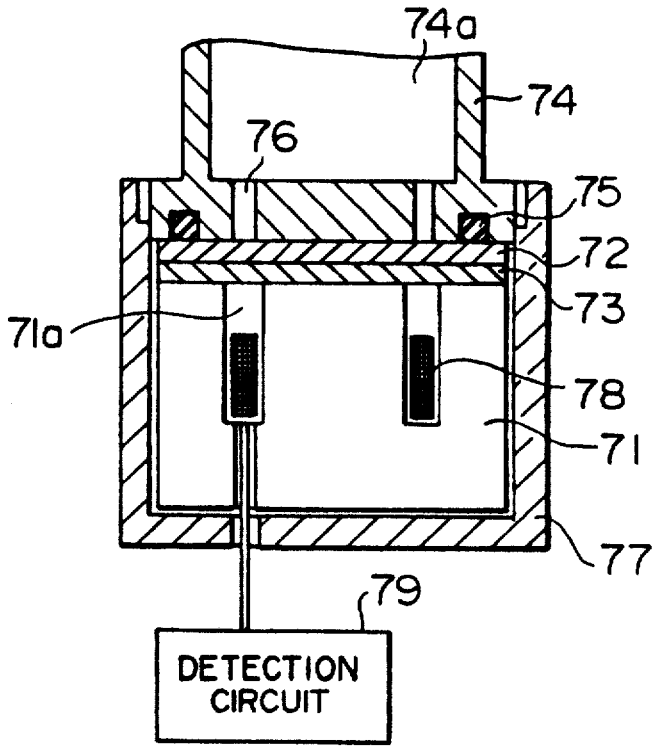
FIG. 12 is a sectional view of a conventional pressure sensor.

The relationship of the linearity to the thermal strain $\epsilon_t$ was investigated on 20 samples. The result is shown in FIG. 11. In FIG. 11, the value of a strain indicated by the vertical dotted line corresponds to a magnitude of a strain $\epsilon_p$ produced in the columnar body under a condition where a pressure $P_i=202$ kg/cm$^2$ is applied. It is experimentally confirmed that this strain $\epsilon_p$ is equal to a strain to be produced in the columnar body by a pressure.

It can be seen from FIG. 11 that the linearity is remarkably improved in the pressure sensor which satisfies the inequality relationship (1) that a thermal strain due to the difference in thermal expansion coefficients is larger than a strain due to a pressure.

Owing to the structure and operation afore-mentioned, a pressure sensor having higher accuracy and linearity as compared with a conventional pressure sensor can be obtained.

As explained, according to the present invention, elements for detecting a permeability are respectively disposed at a deforming part and a non-deforming part, and the difference between outputs of the detecting elements is derived, thereby giving a stable output independent of the temperature. In addition, by securing an amorphous magnetic alloy member to the deforming part, the magnitude of an applied pressure can be measured without substantial hysteresis error.

What is claimed is:

1. A pressure sensor comprising:

a sensor body having a pressure introducing opening therein, a deforming part to be distorted by a pressure applied through said pressure introducing opening, and a non-deforming part not to be distorted by said pressure;

at least one, amorphous magnetic alloy member exhibiting magneto-striction respectively secured to said deforming part and said non-deforming part;

permeability detector elements each disposed, relative to each of said deforming part and said non-deforming part, so as to form a magnetic circuit in combination with said amorphous magnetic alloy member; and an electric detector means for detecting a change of permeabilities in said two elements and a difference therebetween [.], *wherein*

*said sensor body is made of a material having a thermal expansion coefficient larger than that of the amorphous magnetic alloy member exhibiting positive magnetostriction, and said amorphous magnetic alloy member is secured at a temperature exceeding a temperature range for operating said pressure sensor.*

[2. The pressure sensor as claimed in claim 1, wherein said sensor body is made of a material having a thermal expansion coefficient larger than that of the amorphous magnetic alloy member exhibiting positive magnetostriction, and said amorphous magnetic alloy member is secured at a temperature exceeding a temperature range for operating said pressure sensor.]

3. The pressure sensor as claimed in claim 1, wherein said means for detecting the permeability of said amorphous magnetic alloy members comprises a magnetic head or coil.

4. The pressure sensor as claimed in claim 3 further comprising a yoke of high permeability disposed at an outside of said coil.

5. The pressure sensor as claimed in claim 1, wherein said at least one magnetic alloy member comprises a magnetostrictive amorphous magnetic alloy member continuously extended over both of said deforming and non-deforming parts and being secured to said deforming part and said non-deforming part.

6. The pressure sensor as claimed in claim 1, wherein said non-deforming portion has therein a hollow portion of the same diameter as that of a pressure chamber inside said deforming part.

7. A pressure sensor comprising a columnar body with a radius $r_o$ including a pressure introducing opening therein, a deforming part having therein a pressure chamber with a radius $r_i$ which is distorted by a pressure applied through said pressure introducing opening, and a non-deforming part which is not distorted by the pressure;

at least one magnetostrictive amorphous magnetic alloy member secured to said deforming part and said non-deforming part;

coils each disposed respectively at said deforming part and said non-deforming part to form a magnetic circuit in combination with said amorphous magnetic alloy member, wherein a magnitude of the applied pressure is measured from the difference between inductances of said two coils accompanied with the application of said pressure, and wherein following relationships are satisfied;

$$\epsilon_p = \frac{(2 - \nu)r_i^2 P_i}{E(r_o^2 - r_i^2)} \quad (3)$$

where $\alpha_a$: thermal expansion coefficient of the amorphous magnetic alloy, $\alpha_i$: thermal expansion coefficient of material of the columnar body;

$T_g$: adhering temperature of said amorphous magnetic alloy member to said columnar body, $T_m$: operating temperature of said sensor, $\nu$: Poisson's ratio of the material of the columnar body, E: Young's modulus of the material of the columnar body, and $P_i$: maximum applied pressure.

* * * * *